Oct. 4, 1932.  R. C. HOFFMAN  1,880,390
STEERING GEAR
Filed April 8, 1930    2 Sheets-Sheet 1
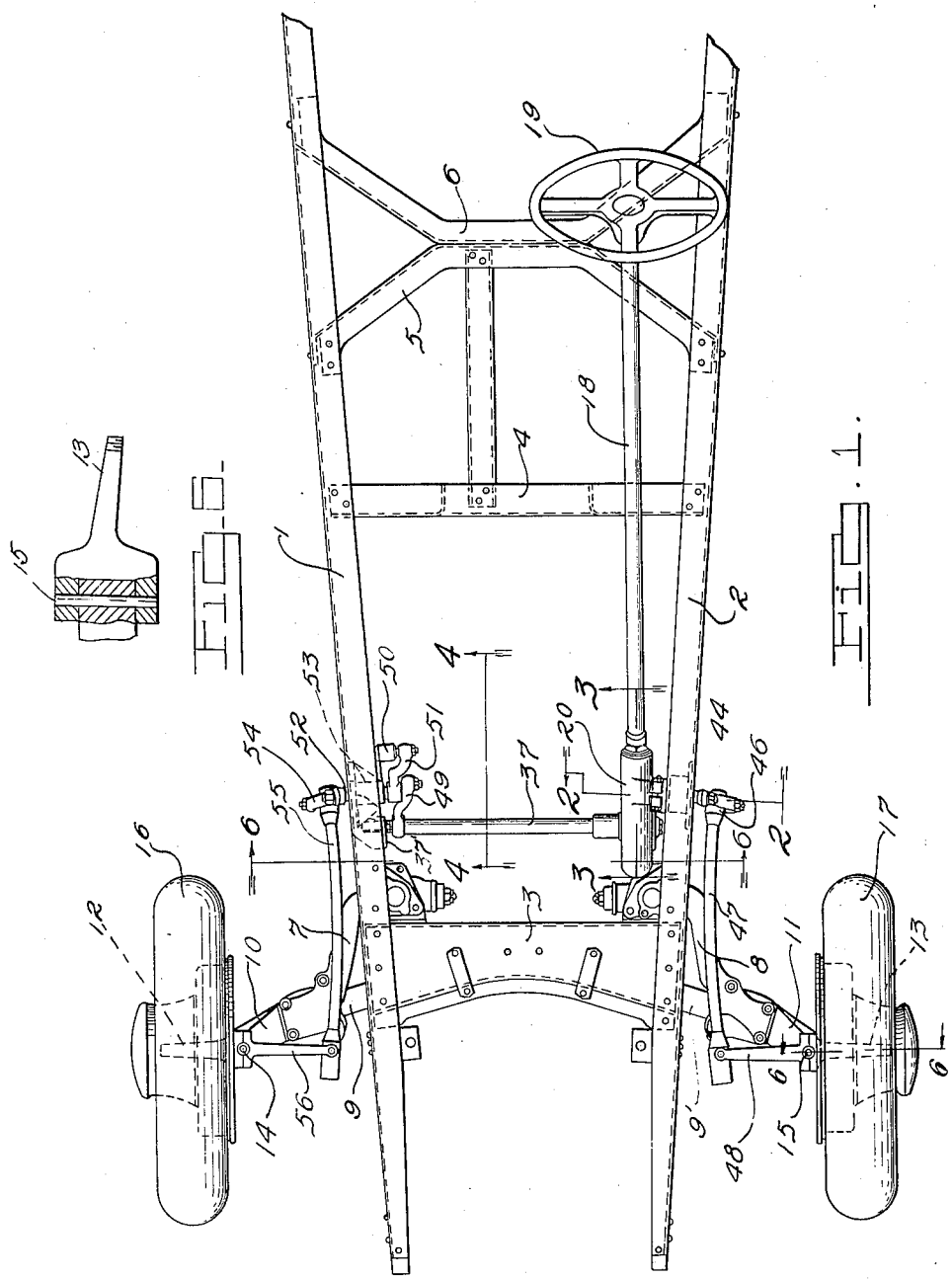
INVENTOR
Roscoe C. Hoffman.
BY
Harness, Dickey, Pierce & Hann
ATTORNEYS.

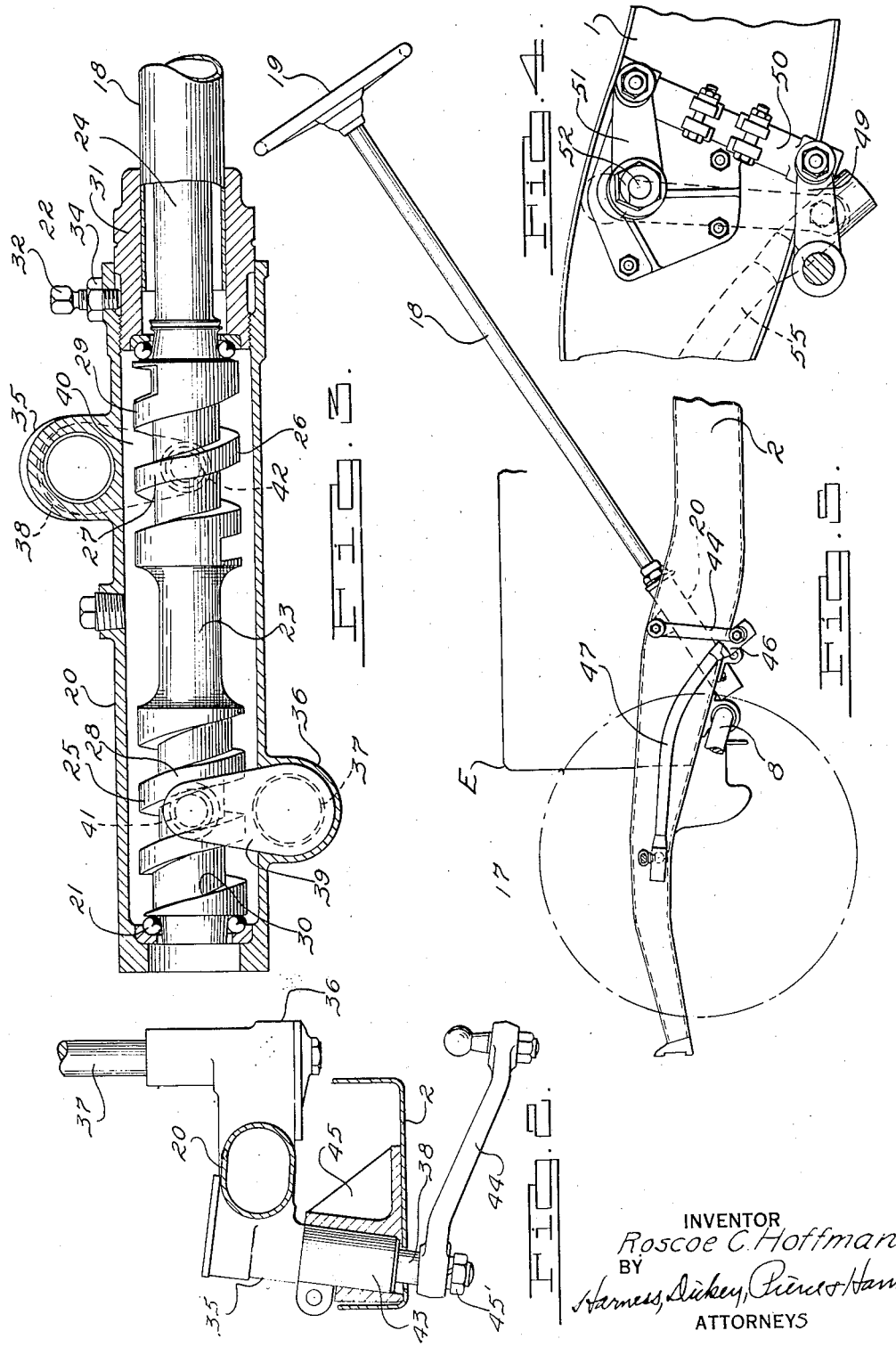

Patented Oct. 4, 1932

1,880,390

UNITED STATES PATENT OFFICE

ROSCOE C. HOFFMAN, OF DETROIT, MICHIGAN

STEERING GEAR

Application filed April 8, 1930. Serial No. 442,648.

This invention relates to improved steering apparatus for motor vehicles.

The main objects of this invention are to provide a steering mechanism for a motor vehicle having steering wheels which are free from rigid connections between them; to provide a steering gear mechanism including substantially independent connections for controlling each of the steering wheels of the motor vehicle; to provide in combination with such a non-interconnected steering wheel construction a common actuating means for controlling the steering movement of the wheels, and to provide a new and novel construction whereby a differential rate of movement is imparted to the steering wheels during steering movement thereof, whereby to adapt them to better conform with a curved path upon which the vehicle is traveling.

An illustrative embodiment of the invention is shown in the accompanying drawings, in which:

Fig. 1 is a top plan view of a vehicle chassis embodying my improved steering apparatus.

Fig. 2 is a vertical transverse section taken on the line 2—2 of Fig. 1.

Fig. 3 is a longitudinal vertical section taken on the line 3—3 of Fig. 1.

Fig. 4 is a longitudinal vertical section taken on the line 4—4 of Fig. 1.

Fig. 5 is a fragmentary side elevation showing the driving side of the vehicle chassis.

Fig. 6 is a fragmentary transverse section of a steering knuckle taken on the line 6—6 of Figure 1.

It is well understood in the art that it is desirable, where practical, to eliminate any direct connections such as axles or tie-rods between the steering knuckles for the steering wheels of a motor vehicle, in order to reduce the possibility of shimmying of such wheels. Where the usual front axle is eliminated, it is, of course, essential that any connection between the steering apparatus for the wheels, such as the conventional tie-rod, be eliminated, and in such case a common mechanism must be provided for simultaneously controlling the steering movement of both wheels. Various constructions have been suggested for taking care of this movement and the present invention relates primarily to a new and novel form of construction for this purpose. It is not to be understood, however, that the present invention is applicable only to motor vehicles in which the usual rigid axle between the steering knuckles is eliminated, for it is well understood that even though the rigid axle is employed, the provision of a construction eliminating the direct connection of the two steering knuckles by a tie-rod is often beneficial in an attempt to eliminate shimmy.

In the forms shown, my improved steering apparatus, is illustrated in connection with a chassis of a vehicle of the front wheel driven type but it is understood that apparatus of substantially the same construction may be used on vehicles of the rear wheel driven type.

The vehicle chassis shown has a frame comprising channel shaped side members, 1 and 2, rigidly secured together by cross members 3, 4, 5 and 6 which are located at the front and intermediate parts of the chassis, the rear end portions of the side members 1 and 2 being also joined together by cross-members (not shown).

Journaled on the side members 1 and 2 of the chassis frame adjacent the forward end of the same are a pair of forwardly extending front wheel supporting arms 7 and 8 which are yieldably supported at their outer ends by diagonally extending transverse springs 9 and 9'. The outer ends of the arms 7 and 8 carry steering knuckle supporting brackets 10 and 11 on which front wheel spindles 12 and 13 respectively are pivotally mounted by king pins 14 and 15. The spindles 12 and 13 are preferably inclined downwardly with respect to the horizontal as shown in Fig. 6 so as to retain the wheels 16 and 17 in cambered relation with respect to each other.

The steering apparatus includes a steering column 18 and steering wheel 19 of substantially conventional construction. The steering column 18 extends into a housing 20 which is supported on the inner side of the side member 2 of the chassis frame. Rotatably mounted in the housing 20 between end thrust bearings 21 and 22, is a driving member 23 rigidly mounted on the lower end of the steering post 24 of the column 18. The driving member 23 is provided at its respectively opposite ends with worm-like cams 25 and 26 each having a pitch in substantially the same direction. The pitch of the inner or adjacent end portions 27 and 28 of the cams 25 and 26 respectively is larger in degree than the pitch of the outer end portions 29 and 30 thereof. The driving member 23 is secured against axial movement relative to the housing 20 by a tubular plug 31 which is threaded in the housing 20 and secured against displacement by a set screw 32 having a lock nut 34 thereon.

Formed on the upper and lower sides of the housing 20 are bearings 35 and 36 respectively, spaced from each other axially of the member 23, and disposed with their axes in angular relation to the axis of the member 23. Shafts 37 and 38 are journaled in the bearings 35 and 36 respectively. The inner ends of the shafts 37 and 38 are provided with crank arms 39 and 40 which have crank pins 41 and 42 respectively thereon. The crank pin 41 of the crank arm 39 is located on the left side of the driving member 23 as viewed in Fig. 1 and is engaged with the cam 26 thereon and the crank pin 42 is located on the right side of the driving member 23 and is engaged with the cam 26. The arrangement of the crank pins 41 and 42 on the respectively opposite sides of the cams 25 and 26, which have a pitch of the same general direction, causes the shafts 37 and 38 to be rotated simultaneously in opposite directions by manipulation of the steering wheel 19.

The shaft 38 extends outwardly and upwardly through a tubular support 43 integral with the bracket 45 secured to the left side member 2 of the chassis frame and through an aperture in the side member. The outer end of the shaft 38 is provided with a steering arm 44 which is securely clamped thereto by a nut 45'.

Mounted on the free end of the steering arm 44 is a ball 45 which is located in a socket 46 of a drag link 47. The forward end of the drag link 47 is pivotally secured to the inner extremities of a steering knuckle arm 48 by which the direction of the spindle 13 of the wheel 17 is controlled.

The shaft 37 is located below the housing 20 of the steering column and extends transversely of the chassis below the engine E. The end of the shaft 37 opposite the steering gear is journaled in the bearing bracket 37' mounted on the lower flange of the frame side member 1. A crank arm 49 is secured to the right end of the shaft 47 as viewed in Fig. 1, the free end of which is pivotally secured to an adjustable link 50. The other end of the link 50 is pivotally attached to a crank arm 51 of a shaft 52 which is located above the shaft 37 and is journaled in a bearing bracket 53 mounted on the side member 1 of the chassis frame substantially opposite from the shaft 38 on the left side member 2 of the frame. The shaft 52 is inclined relative to the horizontal at a degree substantially equal to the inclination of the shaft 38 but in a direction opposite thereto. This shaft extends through the side member 1 of the chassis frame and has a steering arm 54 on its outer end which is pivotally connected with the rear end of a drag link 55, the front end of which is pivotally attached to a steering knuckle arm 56 which controls the right hand front wheel 16.

In operation, rotation of the steering column and driving members 23 in a clockwise direction as viewed at the right end of Fig. 3, rotates the crank arm 40 in a clockwise direction and the crank arm 39 simultaneously in a counter-clockwise direction. This action swings the steering arm 44 on the left or steering side of the vehicle rearwardly and turns the wheel 17 to the right. The steering arm 44 of the right side of the vehicle is rotated forwardly thereby also turning the wheel 16 on the right side of the vehicle to the right by the drag link 55 and steering knuckle arm 56.

When the wheels 16 and 17 are turned to the right as above described, the cam pin 42 approaches the outer extremity of the cam 26 which decreases in pitch, while the cam pin 41 approaches the inner end of the cam 25 which increases in pitch. For this reason, a differential rate of movement of the arms 39 and 40 is set up which, during turning of the vehicle to the right, causes the right wheel which is innermost with respect to the center of the arcuate path on which the vehicle is driven to be turned through a larger arc than the left or outmost wheel.

When the vehicle is driven to the left the cam pin 41 approaches the outer end of the cam 25 where the pitch of the cam increases and the cam pin 42 approaches the low pitch end of the cam 26, thereby turning the left wheel through a greater arc than the right wheel.

From the above it will be noted that all direct connection between the steering knuckles, as by a tie-rod, is entirely eliminated with this construction, and the connection between the two wheels through the steering gear is such as to eliminate any possibility of the shimmying tendencies of one wheel from being transmitted directly to the other through the steering apparatus.

Formal changes may be made in the specific embodiment of the invention described without departing from the spirit and substance of the broad invention, the scope of which is commensurate with the appended claims.

What I claim is:

1. In a vehicle, steering apparatus having a pair of individually operable steering arms, each pivotally connected with one of the front wheels of said vehicle, a rotatable steering column and a cam type actuating member constituting the sole gearing between said steering column and said front wheel for oscillating both of said steering arms simultaneously having a low pitch at its intermediate part and a higher pitch at its extremities, one of said arms being driven by the low pitch portion of said cam when the other arm is driven by the high pitch portion thereof and the latter arm being driven by the low pitch portion when the other arm is driven by a high pitch portion of said cam.

2. In a vehicle, steering apparatus comprising a pair of cranks each having a crank arm, a pair of steering arms connected with one of said cranks, means connecting each steering arm respectively with one of the front wheels of said vehicle for turning the latter to drive said vehicle on a curved path, a steering column, an actuating member connected with said column including a pair of cams, each having a different pitch at its opposite ends, and each of said crank arms coacting simultaneously with a portion of said cams of different pitch for oscillating the latter at diverse rates, said actuating member constituting the sole gearing in said steering apparatus between said steering column and said wheel.

3. In a vehicle, steering apparatus comprising a pair of cranks each having a crank arm, a pair of steering arms connected with one of said cranks, means connecting each steering arm respectively with one of the front wheels of said vehicle for turning the latter to drive said vehicle on a curved path, a steering column, a driving member on said column having a pair of worm cams, the pitch of the inner ends of said cams being greater than the pitch of the outer ends thereof, and a pair of lugs one on each of said crank arms and one engaging each of said worm cams at portions of respectively different pitch for turning the wheel nearer the center of curvature of said curved path through a greater arc than the other wheel.

4. In steering apparatus, a steering column having a housing on one end, a worm cam type actuating member in said housing operable by said steering column and having a different pitch at longitudinally spaced portions of said member, a pair of shafts each journaled in said housing, a pair of crank arms one on the inner end of each shaft and each in engagement with a different portion of said actuation member for simultaneously rotating said shafts through respectively different arcs, and means for connecting each of said shafts with a different front wheel of a vehicle so as to turn the same through respectively different arcs.

ROSCOE C. HOFFMAN.